United States Patent
Crabtree et al.

[11] Patent Number: 6,062,624
[45] Date of Patent: May 16, 2000

[54] SEALING ACOUSTICAL BAFFLE AND METHOD THEREFOR

[75] Inventors: Joseph H. Crabtree, Lebanon, Ill.; Steven Lange, Manchester, Mo.

[73] Assignee: Lear Corporation, Southfield, Mich.

[21] Appl. No.: 09/063,717

[22] Filed: Apr. 21, 1998

[51] Int. Cl.[7] ................................................. B62D 33/00
[52] U.S. Cl. ..................... 296/39.3; 296/39.1; 296/901; 296/193
[58] Field of Search ................... 296/39.3, 901, 296/151, 193, 39.1; 428/319.1, 319.5, 117, 97

[56] References Cited

U.S. PATENT DOCUMENTS

| | | | |
|---|---|---|---|
| 3,847,724 | 11/1974 | Powers et al. | 428/319.1 |
| 4,292,369 | 9/1981 | Ohashi et al. | 428/319.1 |
| 4,632,865 | 12/1986 | Tzur | 428/319.1 |
| 4,698,278 | 10/1987 | Prang | 428/319.1 |
| 4,709,781 | 12/1987 | Scherzer | 428/319.1 |
| 4,743,485 | 5/1988 | Ting | 428/319.1 |
| 4,810,548 | 3/1989 | Ligon, Sr. et al. | |
| 5,089,311 | 2/1992 | Ligon, Sr. | |
| 5,456,513 | 10/1995 | Achmidt | 296/39.1 |
| 5,496,868 | 3/1996 | Hasegawa et al. | |
| 5,529,824 | 6/1996 | Walendy et al. | |
| 5,531,500 | 7/1996 | Podvin | 296/191 |
| 5,560,967 | 10/1996 | Isaksen | |
| 5,595,415 | 1/1997 | Beaulat | 296/39.1 |
| 5,658,652 | 8/1997 | Sellergren | |
| 5,678,826 | 10/1997 | Miller | |
| 5,679,432 | 10/1997 | Holmquest et al. | |
| 5,806,915 | 9/1998 | Takabatake | 296/901 |

*Primary Examiner*—Joseph D. Pape
*Assistant Examiner*—Kiran Patel
*Attorney, Agent, or Firm*—Emch, Schaffer, Schaub & Porcello Co., L.P.A.

[57] ABSTRACT

This is a sealing material for filling a cavity of a pillar or another body member of an automobile. The material is a sealing acoustical baffle of a sandwich of foil faced paper board with an expandable sealant between the boards. The baffles force the sealer to flow out horizontally from the boards to totally seal all corners of the cavity. The in-line manufacturing of extruded laminated material allows in-line die cutting with quick change dies and/or water jet cutting. Acoustical value is very high due to the barrier affect of the foil kraft board. If the cavity size changes as they often do during pilot, prototype and production, the only tooling charge is a simple steel rule die or modified water jet program.

16 Claims, 3 Drawing Sheets

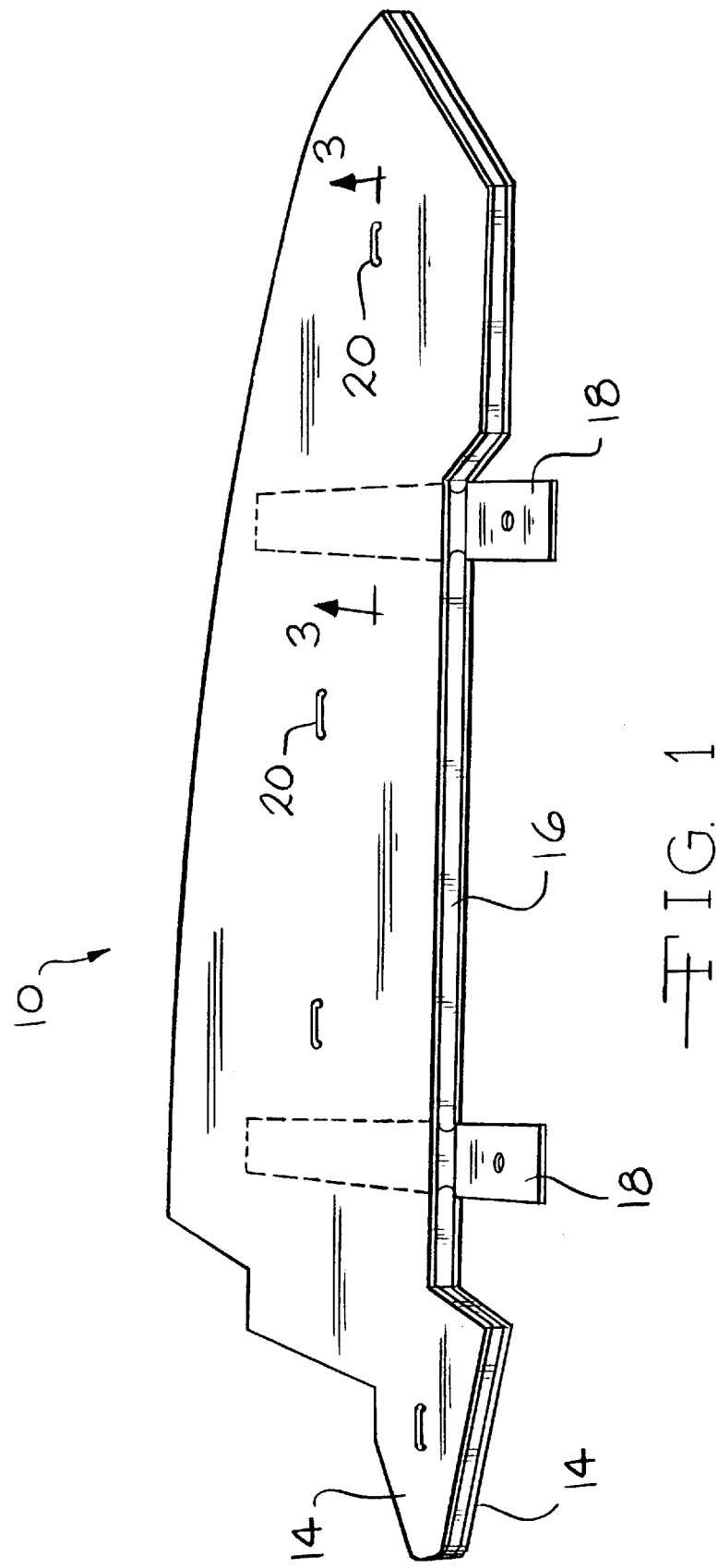

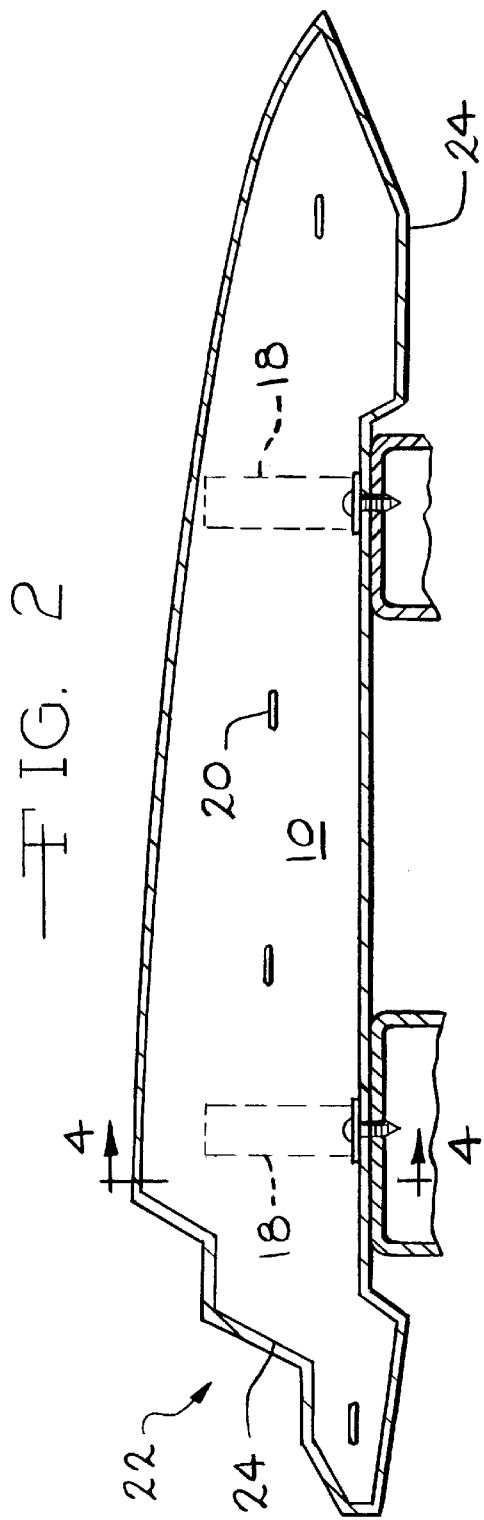
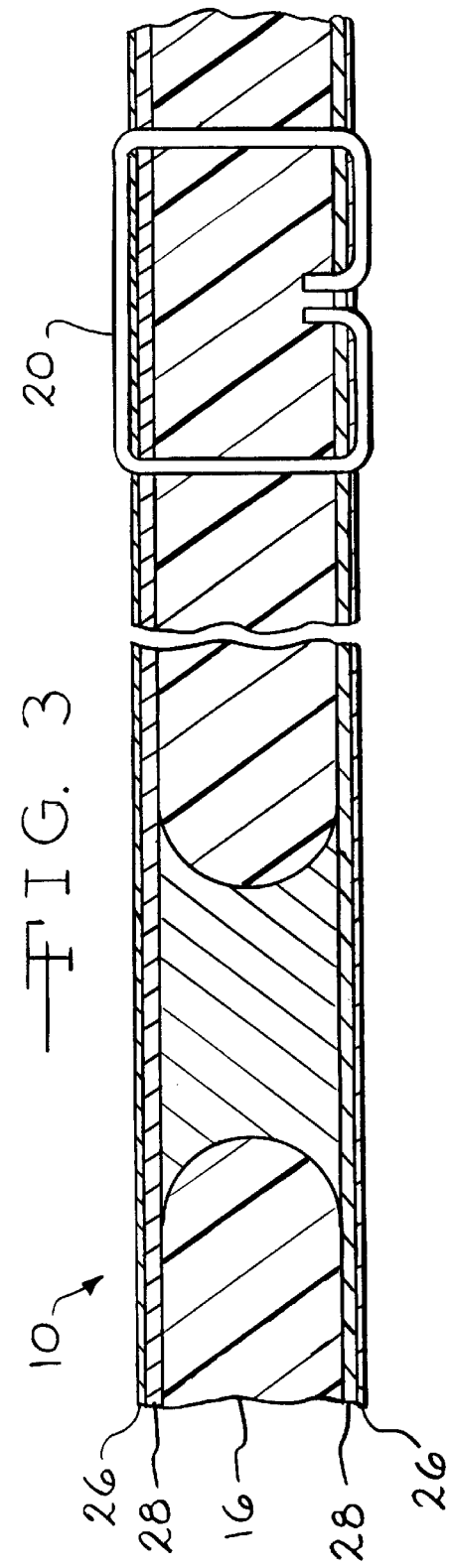

6,062,624

SEALING ACOUSTICAL BAFFLE AND METHOD THEREFOR

TECHNICAL FIELD

This invention relates to a sealing material for filling a cavity of a pillar or another body member of an automobile. In another aspect of this invention, the method forces or pushes the sealer to fill the cavity.

BACKGROUND ART

Various articles of manufacture are made with cavities located in areas where mechanical vibration, wind and water can enter, causing undesirable noises and increasing the likelihood that the article will rust. In an automobile, the pillars which outline parts of the windshield and other windows and provide support to the roof have these cavities. Similar cavities are also found in the lower rockers, fenders and quarter panel areas.

These pillars are made from inner and outer sheet metal panels which fit together so that mating flanges are welded in place to form auto body parts. The panel are spaced apart to form a hollow space or cavity between the panels. These voids or cavities generate the undesirable noises and trap moisture therein. Rain, snow, car washes and road moisture splatter on an automobile or truck from normal use. Road moisture is especially undesirable because it often contains rust accelerators such as sodium chloride used to melt ice during colder months where winter is a common occurrence.

Common practice is to fill the cavities with a foam for the purposes of preventing engine vibration, road noise, wind noise and absorbing vibration. Various methods fill the cavities with the foam. For example, foam previously shaped to fit the cavity is inserted through an access opening. Alternatively, a foamable material which is capable of foaming and expanding upon heating is placed in the cavity and later foamed to fill the cavity by heating during paint curing.

The former method of inserting a shaped foam body into a cavity, however, has the problem of not completely filling the cavity. Often, pre-shaped material does not completely fill the cavity from corner to corner. The latter method also suffers from several problems. Heating varies and blowing agents are difficult to measure. Also, where large volumes are filled, cost and added weight are detrimental. These variables also lead to not filling the cavity from corner to corner.

One recent method forms a shaped, heat-expandable sealant plug slightly smaller than the cavity. The process than heats the body member and sealant plug to a predetermined temperature and holds them substantially at that temperature for a predetermined time. The heat expands the sealant plug within the body member cavity and generates an expanded sealant plug which blocks and seals the cavity.

Another recent method uses a sealing material which is disposed in a cavity of a pillar or another member in an automobile and heated for foaming to fill the cavity. The sealing material is nothing more than another urethane foam. This system requires using a process comprising the steps of furnishing a liquid composition comprising an organic polyisocyanate compound, a foam stabilizer and a blowing agent which generates gases at a temperature of about 130° to 210° C., uniformly dispersing an inert gas in the liquid composition by mechanical agitation to form a bubbled composition, shaping the bubbled composition into a predetermined shape and heat curing the bubbled shape at a temperature below the decomposition temperature of said blowing agent.

The more recent methods still have the same problems of the former prior art methods. They still require heating, expansion, predicting volume and have little control over filling out to the corners of the cavities.

DISCLOSURE OF THE INVENTION

Our sealing acoustical baffle is a better cavity sealer due to its directional flow of sealant. The product and process increases our ability to fit irregular shapes. The process saves money because the product can be die cut or water jet cut to any shape and thickness. This lowers tooling costs, provides quick turn around and is easily adjustable. The product has higher acoustical values than current prior art sealants. Our sealing acoustical baffle is a sandwich of foil faced kraft board with an expandable sealant between the boards.

Our in-line manufacturing of extruded laminated material allows in-line die cutting with quick change dies and/or water jet cutting. The acoustical value is very high due to the barrier effect of the foil kraft board. Unlike prior art products which require high expansion sealers to rise to fill the cavity, our baffle system forces sealer to flow out horizontally to totally seal all corners. Our baffle may also be positioned in any orientation. If the cavity size changes as they often do during pilot, prototype and production, the only tooling charge is a simple steel rule die or modified water jet program. Nylon clips and pins are designed to interchange with standard baffle sizes.

BRIEF DESCRIPTION OF THE DRAWINGS

FIG. 1 is a perspective view of the sealing acoustical baffle of this invention.

FIG. 2 is a perspective view of a section of a vehicle body member with the sealing acoustical baffle mounted therein.

FIG. 3 is a schematic cross-section view of FIG. 1 taken along line 3—3.

BEST MODE FOR CARRYING OUT INVENTION

Figure 4:
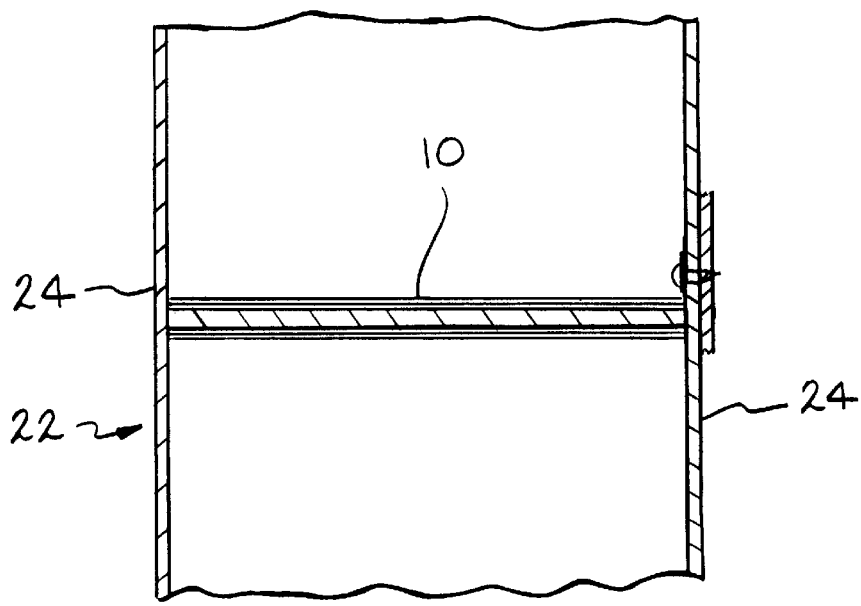
FIG. 4 is a schematic cross view of FIG. 2 taken along line 4—4.

Typically, sealing materials and methods are illustrated in relation to a body member such as a vehicle body pillar such as the upper portion of an "A" or "C" pillar in a passenger automobile. We have chosen to illustrate our sealing materials and methods in quarter panel body member because this body part better shows our ability to fit irregular shapes.

FIG. 1 shows sealing acoustical baffle 10. Baffle 10 includes foil laminated boards 14. Sandwiched between foil laminated boards 14 is expandable sealant 16. Clips 18 (bracket retainers) hold baffle 10 in place. Clips 18 are made of nylon 6,6. Staples 20 also are shown. Staples 20 hold baffle 10 together.

FIG. 2 shows quarter panel 22 with sealing acoustical baffle 10 mounted therein. Sheet metal 24 encases baffle 10. Sheet metal 24 may include radius cutouts (not shown). The cutouts provide for drainage. While FIGS. 1 and 2 show clip 18 in phanton beneath baffle 10, clips 18 may be U-shaped with baffle 10 sandwiched between the legs of the clip. Clips 18 also may be on the top side of baffle 10.

FIG. 3 is a schematic cross-section view of FIG. 1 taken along line 3—3. FIG. 3 shows baffle 10 in greater detail. Baffle 10 includes foil faced boards 14 which comprises aluminum foil 26 and kraft boards 28. Sandwiched between kraft boards 28 is expandable sealant 16. FIG. 3 also shows staple 20 in greater detail.

FIG. 4 is a view of FIG. 2 taken along line 4—4 taken before expandable sealant 16 is expanded. Foil faced boards 14 still contain sealant 16.

Figure 5:
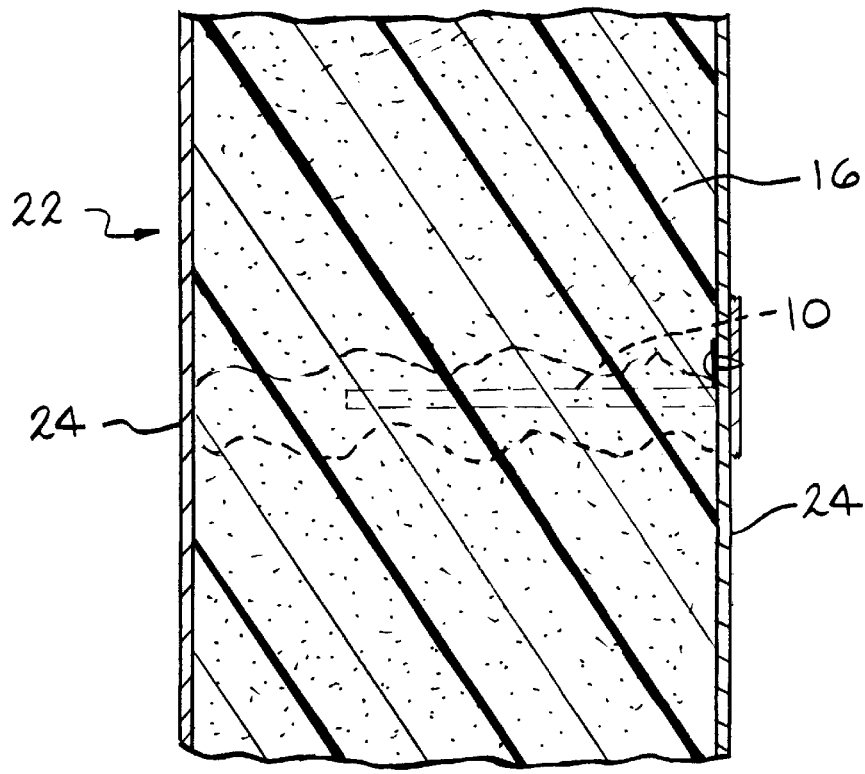
FIG. 5 is a view of FIG. 4 taken after expansion of the sealer.

FIG. 5 shows expandable sealer 16 expanded to fill the corners in the cavity of quarter panel 22. Expanded sealer 16 also encapsulates baffles 10 after it flows horizontally from between boards 14.

The foam or expandable material is sandwiched between two layers of foil coated kraft board. The foil we use preferably is aluminum foil. The aluminum foil preference is based on its availability and cost effectiveness. Other metallic foils such as copper foil may be used if desired. The metal foil can be as thick as that used for beverage cans (0.006") or as thin as that used for food wraps (0.0003"). Commercial aircraft fuselage thicknesses of 0.040" while useful would not be necessary for this application.

The acoustical board we use also varies widely. Preferably, the board has a thickness of 0.027". The board can be as thin as 0.01 inch. We have found high density paper board to be especially useful. We also could use high density insulation board made of glass fibers or mineral fibers. We also could use fiber glass reinforced plastic (FRP) of the same thickness. Ease of cutting and handling are key to our choice of board material. Thin plastic films such as polyethylene film are not satisfactory.

The board thickness we use ranges up to ¼". The board itself varies widely. The paper usually is a semisynthetic product made by chemically processing cellulosic fibers. A wide variety of sources have been used for specialty papers (flax, bagasse, esparto, straw, papyrus, bamboo, jute, and others), but by far the largest quantity is made from softwoods, such as spruce, hemlock, pine, etc. Other sources include hardwoods such as poplar, oak, etc., as well as synthetic fibers. Papermaking technology involves the following basic steps: (1) chipping or other subdivision; (2) manufacture of chemical or semichemical pulp by digestion in acidic or alkaline solutions; (3) beating the pulp to break down the fibers and permit proper bonding when the sheet is formed; (4) addition of starches, resins, clays and pigments to the liquid stock; and (5) formation of the sheet continuously on a fourdrinier machine, where the water is screened out and the sheet dried by passing over a series of heated drums. Other processing steps for brightening, finishing and coating also may be used.

The foaming material we employ may vary widely. The foam material may be open or closed cell. Many of the foaming materials are plastic foams. The plastic foam is a cellular plastic which may be either flexible or rigid. Flexible foams may be nitrile/PVC, polyurethane, EPDM, rubber latex, polyethylene or vinyl polymers. Rigid foams are chiefly polystyrene, polyurethane, epoxy and polyvinyl chloride. The blowing agents used are sodium bicarbonate or halocarbons such as $CCl_3F$. Other foaming materials may include thermoplastic foams such as polypropylene foams.

We have found high expansion sealers based on nitrile/PVC, EPDM and styrene-butadiene polymers to be especially useful. Typically, the sealers contain 10 to 60 weight percent of the polymer. Preferably, they contain 15 to 50 weight percent of the polymer. The weight percents herein are based on weight average molecular weight. Two preferred formulations follow. The first high expansion sealer has a 400% to 500% expansion. The second has a 500% to 700% expansion. We can tailor the expansions more specifically if desired. For example, we have a formulation with a 450% to 550% expansion.

EXAMPLE I

400%–500% EXPANSION

| Chemical Name | % By Wt. |
| --- | --- |
| Styrene-Butadiene Polymer | 20–40 |
| Antimony Oxide | 1.48 |
| 1.2 Benzenedicarboxylic Acid, Diisodecyl Ester | 10–20 |
| Benzene,1,1'-oxybis(2,3,4,5,6 pentabromo | 3.70 |
| Silicon Dioxide | 5–15 |
| Amorphous Silicate | 5–15 |
| Zinc Oxide | 1.54 |
| 4-Morpholinyl-2-Benzothiazole Disulfide | 1–5 |
| Azodicarbonamide | 1–5 |
| Benzenesulfonic Acid, 4,4'-Oxybisdihydrazide | 1–5 |
| Sulfur | <1 |
| Petroleum Wax | 10–20 |
| Iron Oxide | 1–5 |
| Hydrocarbon Resin | 10–20 |

EXAMPLE II

500%–700% EXPANSION

| Chemical Name | % By Wt. |
| --- | --- |
| Styrene-Butadiene Polymer | 15–30 |
| 1.2 Benzenedicarboxylic Acid, Diisodecyl Ester | 5–10 |
| Silicon Dioxide | 1–5 |
| Zinc Oxide | 1.81 |
| Benzenesulfonic Acid, 4,4'-Oxybisdihydrazide | 1–5 |
| Aluminum Oxide Trihydrate | 20–40 |
| Axodicarbonamide | 1–5 |
| Sulfur | <1 |
| Zinc Mercaptobenzothiazole | 2.25 |
| Petroleum Wax | 5–10 |
| Carbon Black | <1 |
| Polyisoprene | 1–5 |
| Hydrocarbon Resin | 5–10 |
| Zinc Borate | 6.39 |
| Zinc Diacrylate | 2.13 |

Sound Pressure Level (SPL) & Sound Insertion Loss (SIL) measurements were performed to measure the acoustic performance of new baffle systems. We conducted SIL measurements of new baffle systems applied in standard testing 3"×3" square pipes. We also conducted SIL measurements in order to compare the new baffle system versus prior art baffle systems applied in C-Pillar like pipes.

The dynamic range of the measurement system for the 3"×3' pipe test were as follows. The average SPL for the baseline measurement (open pipe) is 92.3 dB, for the closed pipe (sheet metal) is 58.6 dB. The dynamic range of apparatus (closed pipe filled with foam and barrier materials) is 44.5 dB and the background noise is 15.1 dB.

Overall, SIL comparison was as follows. The average SIL one sample was 45.9 dB. It shows the best acoustic performance. The average SIL of another sample was 37.0 dB. The average SIL of another sample was 34.5 Hz.

We also measured the influence of sealant thickness on SIL. 6 mm sealant has the best acoustic performance compared to prior art 4 mm sealant, prior art 2 mm sealant and prior art 8 mm sealant. We also did SIL comparisons of two 4 mm sealant baffles. The average SIL of our sample was 34.5 dB and the average SIL of the prior art sample was 34.6 dB. The prior art samples were urethane foams.

We also measured SIL comparison of prior art baffle versus our baffle. Average SIL of prior art sample is 33.4 dB and the average SIL of another prior art sample was 30.6 dB. The prior art baffle was urethane foam bonded to single sheet of a thin plastic film which was probably a low density polyethylene film.

We also did a dynamic range of the measurement system for C-Pillar like pipe test. Average SPL for baseline measurement (open pipe) was 84.6 dB, for another sample was 53.9 dB, for dynamic range of apparatus measurement (closed pipe filled with foam and barrier materials) was 22.8 dB, and for background noise was 15.1 dB.

We then did a SIL comparison of the same prior art baffle versus our baffle. The average SIL of our sample is 30.6 dB, and the average SIL of prior art sample is 12.1 dB. Our sample is much better than the prior art sample in the entire frequency range.

We claim:

1. A vehicle body member having a cavity therein, wherein the cavity has a multiplicity of corners and a sealing acoustical baffle disposed in the cavity for sealing the cavity against engine, road, wind noise and fluid intrusion, wherein the sealing acoustical baffle is a sandwich of two foil faced boards with an expandable sealant between the boards, wherein the expandable sealant, upon expansion, flows horizontally out from the boards and fills the corners of the cavity.

2. A member according to claim 1 wherein the boards have an outer surface and an inner surface, wherein the foil is on the outer surface of the boards and the expandable sealant is between the inner surfaces of the boards.

3. A member according to claim 1 wherein the foil is a metal foil, the boards are paper boards and the expandable sealant contains natural or synthetic rubber.

4. A member according to claim 3 wherein the paper boards are kraft paper boards.

5. A member according to claim 3 wherein the expandable sealant contains 10 to 50 percent by weight of the rubber.

6. A member according to claim 3 wherein the expandable sealants contain 15 to 50 percent by weight of the rubber.

7. A member according to claim 3 wherein the rubber is a nitrile, PVC, EPDM or styrene-butadiene polymer.

8. A member according to claim 3 wherein the metal foil is aluminum foil.

9. A member according to claim 1 wherein the foil has a thickness ranging from 0.0003 to 0.006 inch.

10. A member according to claim 1 wherein the board has a thickness ranging from 0.01 inch to ¼ inch.

11. A member according to claim 1 wherein the paper board has a thickness of 0.027 inch.

12. A member according to claim 1 wherein the expandable sealant has a thickness ranging from 0.1 to 0.4 inch.

13. A member according to claim 1 wherein the boards contain the expandable sealant prior to expansion.

14. A member according to claim 1 wherein the expandable sealant, after expansion, fills and corners of the cavity and encapsulates the two foils faced boards.

15. A method of sealing a vehicle body member cavity having a multiplicity of corners against road noise, engine and power train vibration, wind noise and fluid intrusion comprising the steps of:

inserting a sealing acoustical baffle in the cavity of the body member wherein the sealing acoustical baffle is a sandwich of two foil faced boards with an expandable sealant between the boards; and expanding the sealant and forcing the sealant to flow out horizontally from the boards to fill the corners of the cavity.

16. A method according to claim 15 wherein expanding the sealant encapsulates the two foil faced boards with the expanded sealant.

* * * * *